United States Patent
Farmont

[11] Patent Number: 5,487,459
[45] Date of Patent: Jan. 30, 1996

[54] COLLECTION AND ISSUING APPARATUS FOR ROUND PARKING CARDS

[75] Inventor: Johann Farmont, Dusseldorf, Germany

[73] Assignee: Farmont Tecknik GmbH & Co. KG, Germany

[21] Appl. No.: 196,648

[22] Filed: Feb. 15, 1994

Related U.S. Application Data

[63] Continuation-in-part of Ser. No. 84,545, Jun. 29, 1993, abandoned.

[30] Foreign Application Priority Data

Feb. 20, 1993 [DE] Germany .............................. 9302481 U
Jan. 13, 1994 [DE] Germany .......................... 44 00 744.2

[51] Int. Cl.[6] ............................ G07F 7/02; G07B 15/00
[52] U.S. Cl. .......................... 194/213; 194/344; 194/902; 221/268; 235/384
[58] Field of Search ..................... 194/205, 210, 194/212, 213, 317, 318, 344, 346, 214, 902; 221/102, 255, 256, 263, 268; 453/41; 235/384, 475, 483

[56] References Cited

U.S. PATENT DOCUMENTS

| | | |
|---|---|---|
| 2,063,356 | 12/1936 | Wiggins . |
| 3,397,764 | 8/1968 | Simjian .................................. 194/212 |
| 3,766,452 | 10/1973 | Burpee et al. . |
| 4,101,701 | 7/1978 | Gordon . |
| 4,257,436 | 3/1981 | Smith ........................................ 453/41 |
| 4,319,674 | 3/1982 | Riggs et al. . |
| 4,380,699 | 4/1983 | Monnier et al. . |
| 4,395,043 | 7/1983 | Gargione . |
| 4,585,930 | 4/1986 | Casden . |
| 4,674,618 | 6/1987 | Eglise et al. . |
| 4,703,164 | 10/1987 | von Ballmoos ......................... 235/384 |
| 4,717,815 | 1/1988 | Tomer . |
| 4,788,102 | 11/1988 | Koning et al. . |
| 4,865,222 | 9/1989 | Sullivan ........................... 221/268 X |
| 4,868,373 | 9/1989 | Opheij et al. ..................... 235/475 X |
| 4,926,996 | 5/1990 | Eglise et al. ...................... 194/213 X |
| 4,960,983 | 10/1990 | Inoue . |
| 4,969,549 | 11/1990 | Eglise ................................. 194/212 X |
| 4,982,070 | 1/1991 | Bezin et al. . |
| 4,990,759 | 2/1991 | Gloton et al. . |
| 5,206,495 | 4/1993 | Kreft . |
| 5,208,110 | 5/1993 | Smith et al. . |

FOREIGN PATENT DOCUMENTS

| | | |
|---|---|---|
| 402821 | 12/1990 | European Pat. Off. . |
| 2625351 | 6/1989 | France . |
| 2231720 | 1/1973 | Germany . |
| 2557984 | 6/1977 | Germany . |
| 2628595 | 1/1978 | Germany . |
| 2926867 | 1/1981 | Germany . |
| 3307986 | 9/1983 | Germany .............................. 235/384 |
| 3339387 | 5/1984 | Germany . |
| 3608165 | 9/1986 | Germany . |
| 391375 | 3/1990 | Germany . |
| 4021770 | 1/1992 | Germany .............................. 194/214 |
| 60-215288 | 10/1985 | Japan . |
| 4004495 | 1/1992 | Japan .................................... 194/214 |
| 5189626 | 7/1993 | Japan . |
| 654942 | 3/1982 | Switzerland . |
| 89/12286 | 12/1989 | WIPO . |
| 91/14237 | 9/1991 | WIPO . |

*Primary Examiner*—Michael S. Huppert
*Assistant Examiner*—Scott L. Lowe
*Attorney, Agent, or Firm*—Steven F. Caserza; Flehr, Hohbach, Test, Albritton & Herbert

[57] ABSTRACT

A collection and issuing apparatus for round parking cards which exhibit an identification and/or communication element and are intended for the charge-related actuation of a parking barrier. The apparatus includes a supply container which exhibits, on the base side, a separation device for the parking cards, having an adjoining vertical shaft with at least one central guiding shaft and side shafts which branch off from the guiding shaft. The shafts exhibit a respective inclination and are intended for issuing and collecting parking cards in a rolling manner under the force of gravity. The apparatus also includes a measuring point which is located in the central shaft, intended for reading the parking cards, which are to be issued and/or collected again, and which is connected to a control device for actuating the parking barrier.

14 Claims, 3 Drawing Sheets

COLLECTION AND ISSUING APPARATUS FOR ROUND PARKING CARDS

This application is a continuation-in-part of U.S. application Ser. No. 08/084,545, filed Jun. 29, 1993, (now abandoned) for A PARKING CARD FOR OPERATING A PARKING BARRIER FOR PAY PARKING, by applicant herein.

FIELD OF THE INVENTION

The invention relates to a collection and issuing apparatus for found parking cards, in particular parking tokens, which exhibit an identification and/or communication element and are intended for the charge-related actuation of a barrier.

Description of the Prior Art

Parking cards are issued to the respective user on passing entrance-control stations of a multi-story car-park or open-air car-park. The data necessary for calculation of parking charges, such as entrance time, date and number of the entrance-control station, can either be stored directly on the parking card, which carries a suitable electronic component for this purpose, or can be transferred, together with an individual identification of the parking card, to a central computer. These parking cards have the great advantage of being re-usable (as a single parking card for different users), as a debit parking card or as an access card for long-stay parkers.

Repeated collection and issuing of the parking cards requires entrance-control and departure-control stations which store the parking cards to be issued and collected again, feed them to a read/write station and deliver them in issuing openings which are accessible to the car-park user. For the calculation of the parking time and parking charges, the parking cards thus have to cover a plurality of transport paths, for which purpose conveying belts or conveying rollers are generally provided. This results in a configuration of the collection and issuing apparatus of the control stations which is of complex design and, in addition, is likely to be disrupted. A smooth issuing operation and/or retrieval of the parking cards is thus not ensured.

SUMMARY OF THE INVENTION

The object of the invention is thus to provide a collection and issuing apparatus for round parking cards which exhibit an identification and/or communication element and are intended for the charge-related actuation of a parking barrier, said apparatus operating safely and reliably and being of simple construction.

This invention provides a collection and issuing apparatus which exploits the shape-related advantages of round, disc-shaped parking cards, in particular their rolling capacity, for the collection and issuing operation, operates largely without driven conveying systems and combines, and thus also minimizes, the transport paths necessary for issuing and retrieving the parking cards.

The parking cards pass in each case individually, separated off from a stack of parking cards, into a vertical shaft, where, owing to a predetermined gradient, the parking cards fall or roll downwards under the influence of their dead weight. The vertical shaft comprises directing shafts which have different gradients and guide the parking cards to selectable locations. The action of the parking cards passing through the vertical shaft is also utilized, at the same time, for reading the respective identification of the parking cards and, if appropriate, for communication with a measuring point. If the response rate of the measuring point for the parking cards which fall or roll past is too low there may be provided arresting means which slow down the falling or running rate of the parking cards and/or permit the parking cards to rest temporarily.

The guiding shaft and the side shafts preferably have delimiting side walls which form sliding or running surfaces for the downwardly moving parking cards. The guiding and side shafts are, in addition, preferably adapted, by means of their dimensions, to the thickness of the parking discs in order to avoid said parking cards tipping or tilting out of the desired upright position. Consequently, the cross-section of the shafts is preferably rectangular and adapted to the cross-section of the parking cards.

In order to ensure a uniform downwards movement of the parking cards without rotation and turning of the parking cards as they run through the vertical shaft, with guiding and side shafts, said parking cards fall through the guiding shaft in the upright position, and the side shafts branch off from the guiding shaft such that the parking cards can run into the side shafts by rolling away from the central guiding shaft via their circumferential surface.

The side shafts may be formed by an issuing shaft and a collection (retrieval) shaft, the issuing shaft having a gradient which leads away from the guiding shaft and the collection shaft having a gradient which leads towards the guiding shaft. The collection shaft is preferably provided above the issuing shaft, with the result that work can be carried out with the measuring point which is arranged between the opening regions of the side shafts in the guiding shaft. In order, if appropriate, also to be able to monitor or control the removal of the parking cards from the issuing shaft via the measuring point in the guiding shaft, said measuring point may comprise a plurality of satellites which are suitable for receiving and, if appropriate, emitting electromagnetic signals.

The issuing shaft may, furthermore, be designed with a pivotable rolling and sliding surface, as a result of which the inclination thereof and thus the gradient in the issuing channel can be changed. In the issuing shaft, in addition to the gradient which is directed downwards and leads away from the guiding shaft, a gradient, which is likewise directed downwards but leads towards the guiding shaft, may then be set. Parking cards which have rolled into a removal position can be moved back into the guiding shaft by pivoting the rolling and sliding surface. At the same time, the extent of the rolling and sliding surface into a passage through the guiding shaft can be selected such that the passage is blocked or released in selectable pivot positions.

The separation device can be easily formed by a constricted part which is in the form of a shaft, is located at the base-side end of the supply container and in which the parking cards can be stacked one above the other. For removal of the respectively lowermost parking card there may be provided a removal means which preferably transfers only one parking card into the vertical shaft at any one time. The removal means can discharge the parking cards one after the other to an inlet region which orients the parking cards for entrance into the vertical shaft.

Other separation devices, for example using separators at the base-side ends of the supply container, may likewise by used.

Further embodiments of the invention can be gathered from the following description.

BRIEF DESCRIPTION OF THE DRAWINGS

The invention is illustrated in more detail hereinbelow with reference to the exemplary embodiments represented in the accompanying drawings, in which.

DETAILED DESCRIPTION OF A PREFERRED EMBODIMENT

Figure 1:
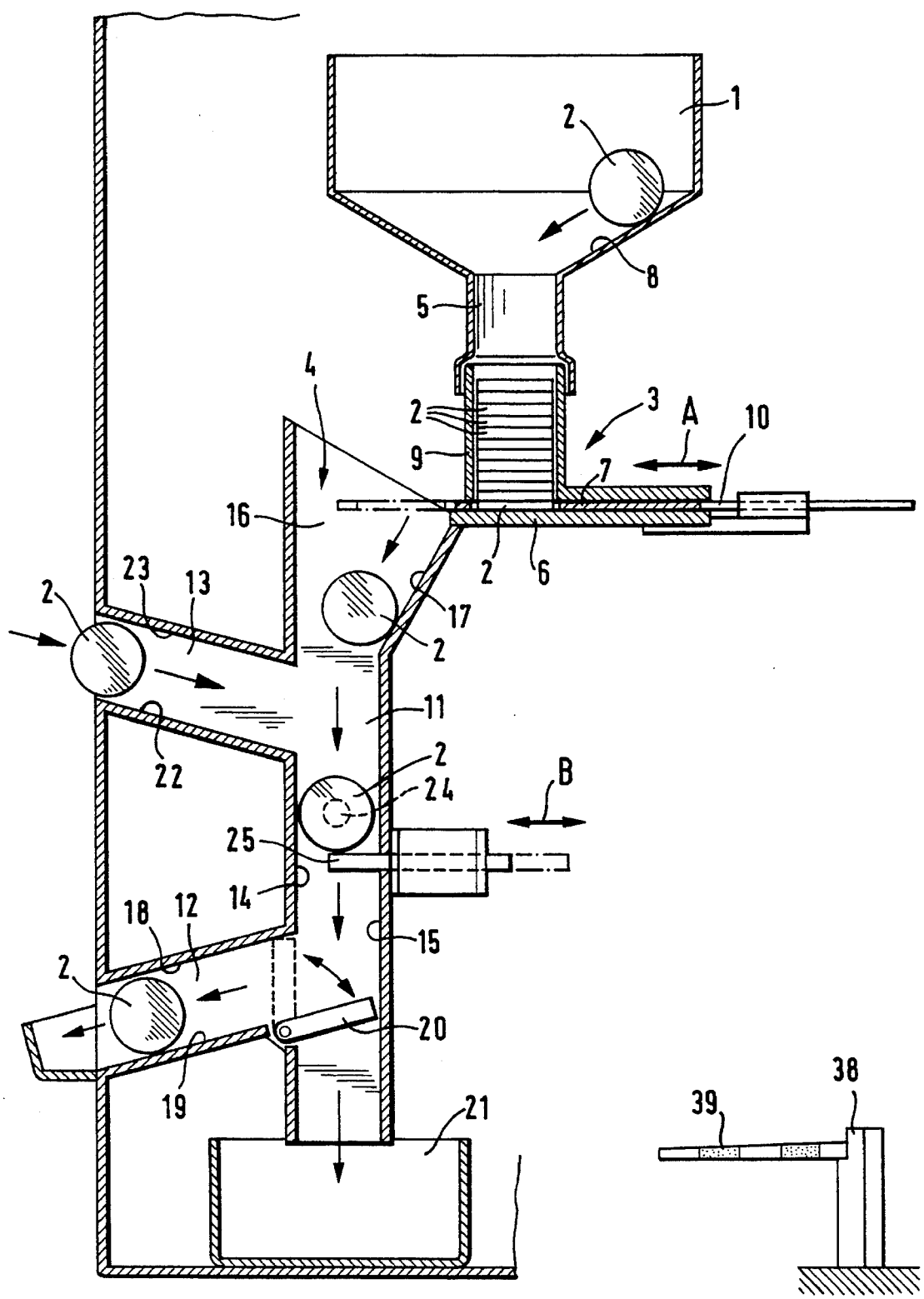
FIG. 1 shows, schematically, a longitudinal section of a first exemplary embodiment of a collection and issuing apparatus for an entrance-control and/or departure-control station of a parking system for the charge-related actuation of a parking barrier.

The first exemplary embodiment, represented in FIG. 1 of a collection and issuing apparatus for an entrance-control and/or departure-control station of a parking system for the charge-related actuation of a parking barrier 39 comprises a supply container 1 for round parking cards 2 which exhibit an identification and/or communication element. The parking cards 2 are collected in the supply container 1 and held ready for issuing to users of a multi-story car-park or open-air car-park.

On the base side, the supply container 1 has a separation device 3, by means of which individual parking cards 2 can be separated off one after the other from a parking-card supply of the supply container 1 in order, thereafter, to pass individually into an adjoining vertical shaft 4.

The separation device 3 comprises here a constricted part 5 which is the form of a shaft and terminates above a guide path 6 along which a removal means 7 operates. The constricted part 5 in the form of a shaft is dimensioned such that at least one stack of parking cards 2 lying flatly one upon the other is formed therein and, if appropriate, a plurality of stacks, arranged one beside the other, of parking cards 2 may also be formed in the constricted part 5, for which purpose there may be provided suitable sliding surfaces in the constricted part 5. For automatically charging the constricted part 5 with parking cards 2, said constricted part 5 comprises a preferably upright shaft with inwardly inclined inlet surfaces 8 which are preferably formed in the base portion of the supply container 1. Owing to their dead weight, the parking cards 2 may then be stacked, lying one upon the other, in the constricted part 5. The constricted part 5 may adjoin, as a continuation, the base of the supply container 1 directly or be combined with an attachment part 9.

The respectively lowermost parking card 2 of a parking-card stack in the constricted part 5 passes into abutment with the guide path 6 without lateral delimitation by the constricted part 5, with the result that the lowermost parking card 2 is exposed for the removal means 7 to act on it laterally. For this purpose, the removal means 7 is displaced forwards, by means of a slide 10, against the circumferential surface of the lowermost parking card 2 and moves it into the vertical shaft 4. The slide 10 then moves back again into its starting position in order that the parking card which previously lay above the lowermost parking card 2 can fall into the lowermost position. The movement directions of the slide 10 are indicated by the arrow A. The slide 10 is designed here as a separator which, in a plate-shaped portion, exhibits a clearance for receiving the respectively lowermost parking card 2.

The vertical shaft 4 comprises a central guiding shaft 11 and a first side shaft 12, which branches off from said guiding shaft and is intended for issuing the parking cards 2 separated off from the stack, and a second side shaft 13, which branches off from the guiding shaft 11 and is intended for retrieving parking cards 2 which have been issued. As will be explained in even more detail hereinbelow, the actuation of the parking barrier (not shown) is linked to the issuing and collection of the parking cards 2 through these side shafts 12, 13. The guiding shaft 11 is designed such that it provides a passage in the form of a distributor for the parking cards, adjacent to which the side shafts 12, 13 branch off.

The central guiding shaft 11 is set up with a gradient in order that the parking cards 2 can move downwards under their dead weight. The central guiding shaft 11 is preferably essentially vertically oriented and has a shaft width, between side surfaces 14, 15, which is preferably only slightly greater than the diameter of the parking cards 2. This results in the parking cards 2 falling downwards through the side surfaces 14, 15 in a vertically directed manner, i.e. in an upright position. In order that the parking cards 2 do not tilt over out of this upright position into the position in which they lie flatly, the transverse width 26 (compare FIG. 2) of the central guiding shaft 11 is adapted to the thickness of the parking cards 2. Consequently, the central guiding shaft 11 is preferably of rectangular cross-section. In order to be able to introduce the parking cards 2 into the vertical shaft 4 in the upright position, in which they are thus capable of rolling, said vertical shaft 4 exhibits, preferably on the inlet side, an inlet portion 16 which connects the separation device 3 to the vertical shaft 4. For this purpose, this inlet portion 16 may have suitable sliding and guide surfaces 17.

The side shaft 12 provided for issuing parking cards 2 is inclined downwards with respect to the horizontal direction and branches off from the central guiding shaft 11 at a distance from the inlet portion 16. The width of the side shaft 12 between two side surfaces 18, 19 is preferably only slightly greater than the diameter of the parking cards 2, which can then enter into the side shaft 12 by rolling out of the guiding shaft 11 via their circumferential surface and can run downwards in said side shaft 12 without danger of jumping. The transverse width 27 (compare FIG. 2), provided for this purpose, of the side shaft 12 is, in particular, preferably selected such that the parking cards 2 are held in the upright position, in which they are capable of rolling, and do not fall over into the flat position. That end of the side shaft 12 which is opposite the guiding shaft 11 can be designed as removal opening for the parking cards 2, which are to be issued, on an outer side of the collection and/or issuing apparatus.

Entrance into the side shaft 12 is controlled via a diverter 20 which optionally either blocks off the through-passage of the central guiding shaft 11 or the through-passage of the side shaft 12.

The length of the central guiding shaft 11 is preferably selected such that said guiding shaft projects beyond the branching-off point of the side shaft 12 and terminates such that it is open, or suitable for opening, over a collecting container 21 for parking cards 2 which have been used.

Seen spatially, the side shaft 13 for the collection of used parking cards 2 branches off from the central guiding shaft 11 above the side shaft 12. The side shaft 13 is inclined upwards with respect to the horizontal direction, with the result that the parking cards 2 introduced into the side shaft 13 roll back into the guiding shaft 11 under the force of gravity. For this purpose, the width of the side shaft 13, between side surfaces 22, 23, is preferably only slightly greater than the diameter of the parking cards 2 and, in particular, the associated transverse width 28 (compare FIG. 2) is preferably adapted to the thickness of the parking cards 2 in order that the latter do not tilt over out of the position in which they are capable of rolling. The transverse widths 27, 28 of the side shafts 12, 13 are preferably the same.

The side shaft 13 for the collection of returned parking cards 2 is preferably arranged above the issuing side shaft 12 in order to be able to re-issue, via said issuing side shaft 12, parking cards 2 which have not been correctly dealt with.

In the central guiding shaft 11 there is arranged, between the branching-off points of the side shafts 12, 13, a measuring point 24 for reading and/or recording an identification and/or communication element of the parking cards 2 and/or communicating therewith. Depending on the response rate of the measuring point 24 there may also be provided means which temporarily hold the parking cards 2, which are in the process of sliding past, in the region of the measuring point 24. In the exemplary embodiment represented, these means are formed by a slide 25 which blocks off the through-passage of the guiding shaft 11 as required. The movement direction of the slide 25 is indicated by an arrow B.

By means of a control means (not shown) to which the function elements are connected, in particular removal means 7, slide 25, measuring point 24 and diverter 20 of the above-described collection and issuing apparatus, as well as the parking barrier 39 and its control device 38, the operation thereof can take place as described hereinbelow.

At the beginning of a parking operation, a parking card 2, triggered by a signal from the car-park user, is separated off from the parking-card stack by a removal means 7 and falls or rolls through the shafts 11, 12 into an issuing opening which is accessible to the car-park user. The diverter 20 is located in the position blocking off the guiding shaft 11 (solid line), with the result that the separated-off parking card 2 falls through the guiding shaft 11, to be precise until it reaches the diverter 20, from where the parking card 2 can roll through the side shaft 12. Before issuing, in the measuring point 24, through which the parking card 2 is to pass and which is located in the vertical shaft 4, the respective identification code is read and fed to a computer, which adds and stores the entrance time, the date and the station number. Alternatively, this data may be recorded onto the parking card 2. By removing the parking card 2 from the issuing opening, which can be identified, for example, via a light barrier or by means of electromagnetic signals, an entrance parking barrier (not shown) is opened.

At the end of a parking operation, the user introduces the parking card 2 into a slot of a paying machine (not shown). There, the identification or the other parking data is read, the entrance time is compared to the actual time by computer and, as a result, the parking charge is established and displayed. After paying the parking charge due, the parking card 2 is released from the paying machine. The computer adopts the new time and adds an allowance time in which the car-park user has to drive out of the car-park. Alternatively, the allowance time may be written into the parking card.

Still with the same parking card 2, the user drives to the exit and introduces the card into the side shaft 13 of the collection and issuing apparatus, from where it passes into the central guiding shaft 11 and to the measuring point 24. At the measuring point 24, the identification is compared to the computer data or the allowance time. If it is valid, a departure barrier is opened and the parking card 2 falls through the guiding shaft 11 into the collecting container 21. The diverter 20 is, here located in the position shown by the broken line. If the parking card is not valid, the diverter 20 blocks off the guiding shaft 11, with the result that the parking card 2 is directed into the issuing side shaft 12 and is given back again.

The parking system may likewise by used for long-stay parkers or season-ticket holders.

Figure 2:
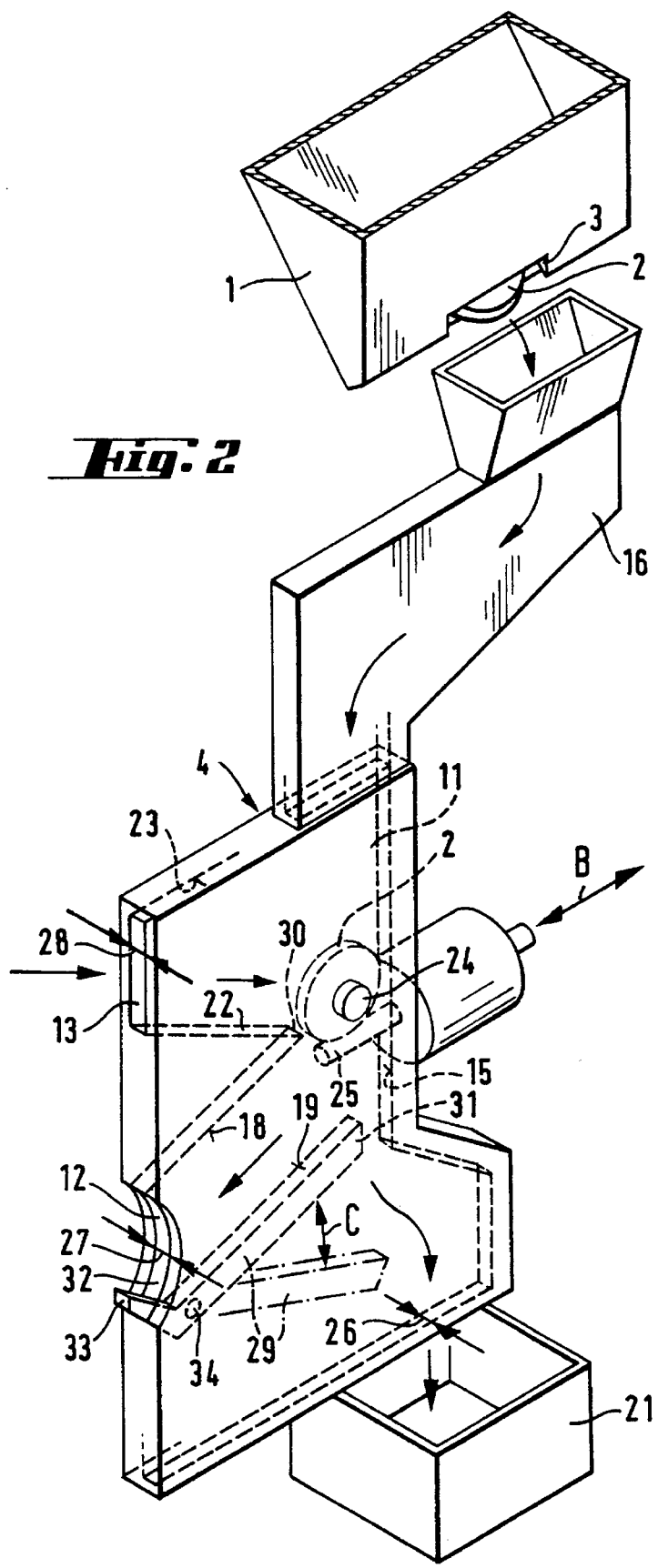
FIG. 2 shows, schematically, a longitudinal section of a second exemplary embodiment of a collection and issuing apparatus for an entrance-control and/or departure-control station of a parking system for the charge-related actuation of a parking barrier.

FIG. 2 shows a second exemplary embodiment of a collection and issuing apparatus for an entrance-control and/or departure-control station of a parking system for the charge-related actuation of a parking barrier, in the case of which a vertical shaft 4 adjoins a supply container 1 for parking cards 2, with the interposition of a separation device 3.

Here, the separation device 3 is formed by an outlet opening which is provided in the base portion of the supply container 1, is intended for in each case one parking card 2 and to which there may be assigned, in or on the container, feed devices and/or separators which are intended for separating the parking cards 2.

In an inlet portion 16, the vertical shaft 4 receives the parking cards 2, discharged one after the other from a supply, preferably in the upright position, in which they are thus capable of rolling. In the inlet portion 16, which is provided with a downwardly inclined gradient and adapted, by means of its lateral dimensions, to the parking cards 2, said parking cards 2 run in each case individually one after the other into the guiding shaft 11. According to one embodiment (not shown), the inlet portion 16 may also be dispensed with.

Moreover, the vertical shaft 4 in this case essentially differs from the first exemplary embodiment in that the side wall 14, running past the side shafts 12, 13, of the guiding shaft 11 is designed only in sections, and the base-side surface 19 of the side shaft 12 is designed on a rocker 29.

An essentially open configuration of the guiding shaft 11 with respect to the side shafts 12, 13 is possible since, owing to the preferred arrangement of the collection shaft 13 above the issuing shaft 12, the parking cards 2 in the upper portion of the guiding shaft 11 are automatically directed back into the guiding shaft 11 in the event of them being thrown out laterally. Passing of the measuring point 24 is ensured by a side-wall piece 30 which forcibly guides the parking cards 2 in the region of the measuring point 24. At the level of the branching-off point of the issuing side shaft 12, the rocker 29 ensures that the falling parking cards 2 are forcibly guided.

As already explained, the parking cards 2 are moved downwards in the vertical shaft 4 under the influence of the force of gravity. Within the side shafts 12, 13, essential function elements for establishing the movement directions are in each case the side surfaces 19, 22 which delimit said shafts 12, 13 on the base side and thus serve as rolling and sliding surfaces. Consequently, in the side shaft 12, the movement direction of the parking card 2 in said side shaft 12 is established by the inclination of the side surface 19 serving as running surface. In order to be able to vary this inclination and thus the gradient in the issuing side shaft 12, the side surface 19 is formed on the rocker 29, which, for this purpose, can pivot perpendicularly with respect to the longitudinal plane of the vertical shaft 4, preferably about a pin. The pivot direction is specified by the arrow C.

The rocker 29 can be displaced into a pivot position in which the side shaft 12 has an upwards gradient which is thus directed away from the guiding shaft 11. In this pivot position, the rocker 29 blocks off, by its end 31 directed towards the guiding shaft 11, the through-passage of the guiding shaft 11 and thus assumes the task of the diverter 20 according to the first exemplary embodiment. A parking card 2 passing into the side shaft 12 then rolls until it reaches a removal opening 32. The respective parking card 2 can be held in the removal opening by means of an upwardly angled-off arm 33 on the rocker 29. The arm 33 thus prevents the parking cards 2 from falling out, this being undesirable, of the collection and issuing apparatus. The parking cards respectively arranged in the removal opening 32 in this manner may either be removed by hand or be ejected by means of a pronounced pivot position, with increased inclination, of the rocker 29.

A light barrier may be provided in the region of the removal opening 32 in order to monitor the removal of the respective parking cards from the removal opening 32. If parking cards 2 exhibit in each case an electromagnetic signal source, use may be made, via an associated receiving device in the vertical shaft 4, of the interruption of the signal reception in order to identify removal. The receiving device may be linked to the measuring point 24. These embodiments for monitoring removal also apply for the first exemplary embodiment.

It is extremely common, in the case of parking operations, for parking cards 2 which have been called up, that is to say those which have been moved into the removal opening 32, are then not, however, removed. Such parking cards 2 have to be taken back, to be precise preferably within a selectable time period, for example 30 seconds. The rocker 29 permits such a retrieval by pivoting into a position in which the running surface 19 has an inclination directed downwards towards the guiding shaft 11. A parking card 2 located in the removal opening 32 then runs back into the same, issuing side shaft 12. It is further ensured that end 31 which is directed towards the guiding shaft 11, with the result that the parking card 2 which has not been removed can fall into the receiving container 21. This pivot position of the rocker 29 also makes it possible for the parking cards 2 which have been returned through the side shaft 13 for collection to be able to fall into the receiving container 21.

The various movement directions in which the parking cards 2 can move in the vertical shaft 4 are marked by arrows. The way in which the parking operation proceeds is comparable with that described for the first exemplary embodiment.

Figure 3:
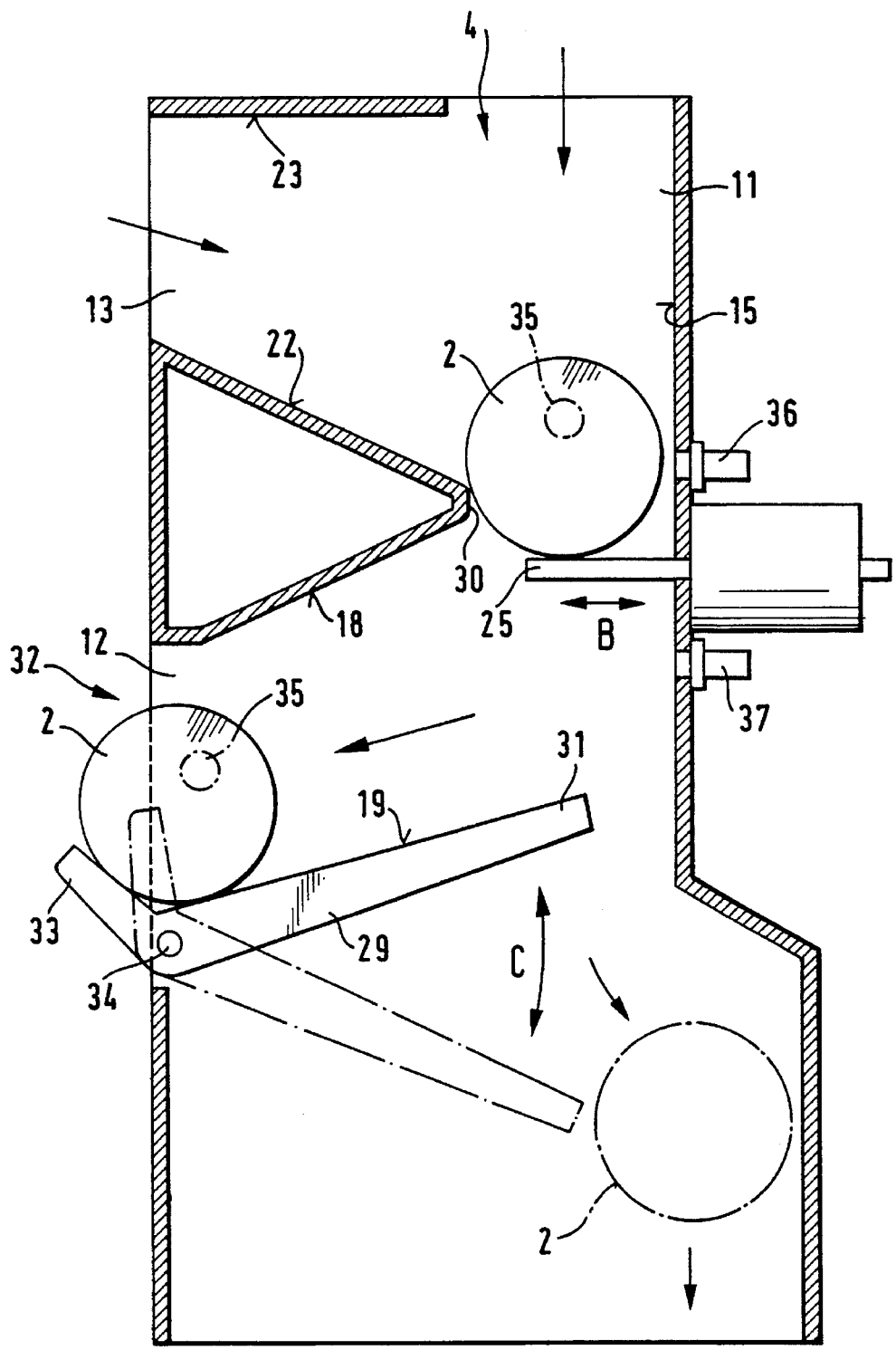
FIG. 3 shows, schematically, a longitudinal section of a sub-region of a third exemplary embodiment of a collection and issuing apparatus.

FIG. 3 shows, schematically, a piece of a third exemplary embodiment of a collection and issuing apparatus, which is essentially the same as the second exemplary embodiment. One difference lies in the arrangement of the pivot point 34 of the rocker 29 with respect to the front edge of the collection and issuing apparatus, and thus also the arrangement of the angled-off arm 33. In contrast to FIG. 2, the pivot point 34 and the orientation of the angled-off arm 33 are selected such that the respective parking cards 2 in the removal position represented in FIG. 3 project beyond the front edge of the collection and issuing apparatus and can thus be easily removed by a car-park user.

Furthermore, the parking cards 2 are provided with an electromagnetic signal source 35. Instead of one measuring point there may be provided a multi-part measuring point which is located in the guiding shaft 11 and may exhibit, in particular, separate, satellite-type receiving devices 36, 37 in order to have, for monitoring the removal of a parking card, a receiving device 37 which is separate from the receiving device or devices 36 for reading or communicating with the parking cards 2 in order to establish and/or process the parking data.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A parking system comprising:

round parking cards, each having unique attributes; and a collection and issuing apparatus including:
    a supply container for holding the parking cards, said container having a base;
    a separation device located at the base for issuing the parking cards to at least one guiding chute, the guiding chute having at least first and second side chutes which branch off from the guiding chute at respective inclinations and which are provided for issuing and collecting the parking cards in a rolling manner under the force of gravity, respectively; and
    a measuring point being located in the guiding chute for reading the unique attributes of issued and collected parking cards, the measuring point being connected to a control means for actuating a parking barrier.

2. A parking system as in claim 1 wherein the at least one guiding chute and the side chutes exhibit dimensions which prevent the parking cards tilting over out of an upright position, in which they are capable of rolling, during their movement through the guiding chute.

3. A parking system as in claim 1 wherein the side chutes are arranged with respect to the at least one guiding chute such that the parking cards move by way of their circumferential surfaces.

4. A parking system as in claim 1 wherein the guiding chute leads into a collecting container for parking cards which have been used and are to be re-introduced into the supply container.

5. A parking system as in claim 1 wherein a diverter, optionally blocking off the guiding chute, is provided at an entrance into one of said issuing chutes.

6. A parking system as in claim 1, wherein the measuring point is assigned a plurality of signal-reception devices which are distributed in the guiding chute for interaction with signal sources integrated with the parking cards.

7. A parking system as in claim 1, wherein the at least one guiding chute is an essentially vertically oriented chute.

8. A parking system as in claim 1, wherein at a base of the supply container, the separation device comprises a constricted part which is in the form of a chute for stacking parking cards, has a width which only slightly exceeds the diameter of the parking cards and is arranged over a separation channel which is in connection with the guiding chute for a removal device to act on the parking cards laterally.

9. A parking system as in claim 8 wherein the removal means comprises a slide which can be displaced beneath the constricted part and has a clearance for receiving in each case one parking card.

10. A parking system as in claim 1 wherein said side chutes include a collection chute and an issue chute, said collection chute branching off from the guiding chute above said issuing chute, and the measuring point being arranged along the guiding chute, between the opening regions of the side chutes.

11. A parking system as in claim 10 wherein, the issuing chute includes an arresting device which blocks off said guiding chute to hold the parking cards temporarily at said measuring point.

12. A parking system as in claim 10 wherein said issuing chute further includes a base-side running surface which is displaceable for blocking off the guiding chute.

13. A parking system as in claim 10 wherein a base-side running surface of said issuing chute is designed as a rocker which varies the inclination of the issuing chute and is suitable for blocking off the guiding chute.

14. A parking system as in claim 13, wherein the rocker comprises two running surfaces which are angled with respect to each other, an issuing-side running surface being designed as a stop surface for a removal position of a parking card which is respectively to be issued.

* * * * *